July 5, 1960  B. BORCHERDT  2,944,018
COMPOSITION AND PROCESS FOR PREVENTING OR
RESTORING LOST CIRCULATION
Filed Oct. 22, 1956

BERT BORCHERDT
INVENTOR.

BY *Lyon+Lyon*
ATTORNEYS

# United States Patent Office 2,944,018
Patented July 5, 1960

2,944,018

COMPOSITION AND PROCESS FOR PREVENTING OR RESTORING LOST CIRCULATION

Bert Borcherdt, 2538 E. Main St., Ventura, Calif.

Filed Oct. 22, 1956, Ser. No. 617,507

9 Claims. (Cl. 252—8.5)

This invention relates to the art of drilling wells and has particular reference to drilling fluid compositions and to a method for preventing or restoring the loss of circulation of drilling fluids when drilling through loose, porous, fractured or creviced formations.

The rotary drilling of oil and gas wells requires the use of a drilling fluid or mud which consists of a suspension in a base of water or oil, or water and oil, of a material such as clays, calcium carbonate, etc. Additional weight materials such as crushed oyster shells, barytes, galena, etc., are often used. The drilling fluid is introduced through the hollow drilling stem and is released into the well hole or bore from openings in the drilling bit, from whence it is pumped back to the surface for recirculation. These drilling fluids perform the functions of lubricating and cooling the drilling bit, carrying the cuttings up to the surface, furnishing a static head to overcome formation pressures, and they form on the walls of the bore hole a substantially impervious sheath or filter cake to prevent the loss of fluid into the formation.

Although as indicated, the usual drilling fluids tend to form a more or less fluid-impervious filter cake which retards or prevents fluid in the well from penetrating into and being wasted in the surrounding earth formations, earth strata are sometimes encountered into which the drilling fluid passes in excessive amount without deposition of an adequate filter cake. This occurs when the earth formation is unusually porous, loose, creviced or fractured, such that openings are present which are large enough to admit the drilling fluid without adequate filtration action and formation of a sealing filter cake. Such loss of circulation of the drilling fluid is obviously extremely dangerous to the economic success of a drilling operation, resulting in loss of valuable drilling fluid material, loss of pressure, the complete suspension of the drilling until the problem is cured, and in some cases even complete abandonment of the entire well.

A great many expedients have been heretofore proposed in attempts to solve this problem of loss of circulation and possibly foremost among these expedients is the addition to the drilling fluid of materials which theoretically will be strained out of the fluid as it passes into the formation of the lost circulation zone, thereby building up a deposit or filter cake of material which will block the passage of further fluid therethrough. A large number of different types of so-called lost circulation materials have been proposed for such use, with varying degrees of success and failure. It is well recognized, however, that heretofore the maximum size of fracture which could be sealed by such lost circulation materials was in the neighborhood of less than 0.25 inch and that if zones containing fractures larger than this were encountered, other more drastic remedies would have to be attempted.

One of the principal objects of this invention is, therefore, to provide a drilling fluid composition containing a novel bridging agent capable of initiating a seal in fractures of 0.25 inch size and larger.

Another object of this invention is to provide a drilling fluid composition and a method for the use of the same, which composition contains a bridging agent for initiating the sealing of large sized fractures, yet which is made of readily available materials, inexpensive and easy to produce in large quantities.

Other objects and advantages of this invention, it is believed, will be readily apparent from the following detailed description of preferred embodiments thereof when read in connection with the accompanying drawings.

Briefly, this invention comprehends within its scope the provision of specially designed and fabricated particles to be added to drilling fluids to aid in preventing or restoring loss of circulation of such fluids while they are used in the rotary drilling of wells. More specifically, it has been discovered as an essential feature of the present invention that a quantity of substantially identical discrete particles, each having a characteristic wedge-like shape, when added to a drilling fluid and circulated in a well hole, function as bridge initiating agents when delivered by the fluid to a lost circulation zone. The term "wedge-like" shape as used herein and in the appended claims is intended to include all fabricated particles having at least on one end thereof a uniformly or non-uniformly tapered portion, or portion of decreasing width dimensions progressing outwardly toward said end. I have found that substantially any basic shape will function properly so long as the shape includes a tapered portion such that the particles will tend to enter the openings in the lost circulation zone and to become wedged therein by the action of the drilling fluid escaping through the openings. Most desirable shapes appear to comprise true wedge shapes or pie shapes having a thickness sufficient to prevent undue distortion or fracturing of the particle when subjected to the stresses of normal use.

Any suitable material that can be fabricated to produce the desired shape can be used. Most desirable, of course, are materials which are capable of being suspended in conventional drilling muds and which will not have any adverse effect upon the mud pumps or upon the mud properties. An excellent material which meets these requirements and which is also quite inexpensive and easy to fabricate is used rubber stock such as that from worn tire carcasses. Synthetic plastic materials are also especially suitable.

Figure 1:
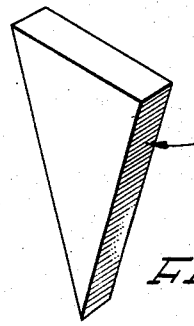
Figure 1 is a perspective view of a preferred form of bridge initiating agent particle.
Figure 2:
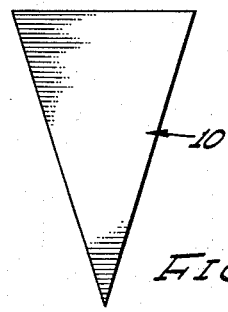
Figure 2 is a plan view thereof.
Figure 3:
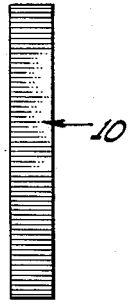
Figure 3 is a side view thereof.
Figure 4:
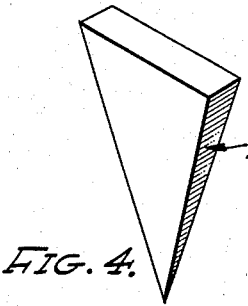
Figures 4 through 10 are perspective views of modified particle shapes.
Figure 5:
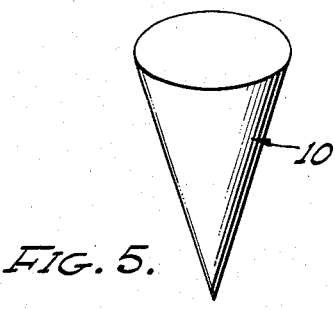
Figure 6:
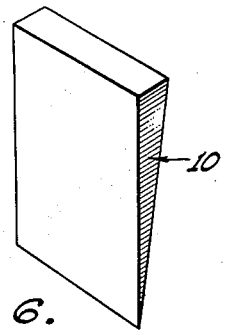
Figure 7:
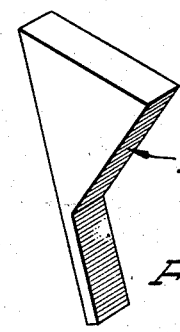
Figure 8:
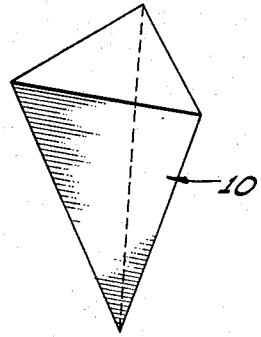
Figure 9:
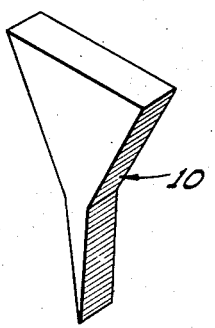
Figure 10:
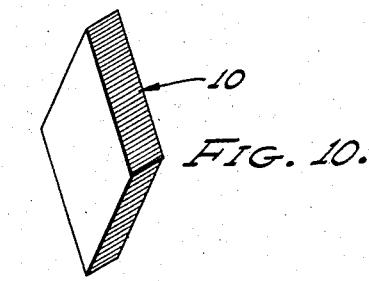

Referring now to the drawings, a preferred form of particle 10 is illustrated in Figures 1, 2 and 3. It will be seen that this type of particle is a simple wedge or basic triangular shape. The particle is cut from a used automobile tire carcass and is about ¼-inch in thickness. The base of the triangle is approximately ⅜-inch and the legs about 1½-inches. While particles of this size are designed to most efficiently form an initial bridge in openings of less than about ⅜-inch, it has been demonstrated that they will initiate a bridge in openings larger in size than the base dimension of the triangular shaped particles, due to the wedging effect among individual particles. Larger and smaller sizes and in fact blends of sizes are contemplated within the invention, the maximum size being limited only by the clearance in the mud pumps. It is to be understood that not all of the particles when introduced to the lost circulation zone will enter the openings in the proper manner, i.e., pointed end first, but it is apparent that a fair proportion of the tens of thousands of particles present in the drilling mud will do so.

Figures 4–10 illustrate modified shapes of particles within the scope of the invention. The finished, packaged material for use in the process of this invention may comprise a blend of differently shaped materials, and moreover, as indicated above, varying sizes of material may be used. In any event, however, it will be understood that drilling fluids embodying the present invention will contain a plurality of these wedge-like particles, and at least substantial quantities thereof will be identical in size or shape. That is, from a standpoint of commercial practicability, there would be little or no reason to blend together more than three or four different sizes of the same shape and it is unlikely that more than two different shapes would be blended together. Hence, of the whole mass of wedge-shaped particles, no less than about one-eighth thereof will be identical in size and shape.

The amount of the particles used in actual practice may vary, depending upon the type of drilling fluid and the particular formation difficulties encountered, although generally from about 2–20 pounds per barrel of drilling fluid will be adequate. The material is preferably used in conjunction with any conventional lost circulation material of which there are many presently on the market. Such conventional lost circulation materials include, but are not limited to granular plastics, perlite, textile fibers, asphalt, mica, asbestos, cellular plastics, cellulose flakes, rock and the like. The particles may be added to all type of drilling fluids, including oil base, water base and emulsion fluids. In the case of oil base fluids, rubber particles should, of course, not be used.

I prefer to use the bridge initiating agent of the present invention in conjunction with ground almond shells as disclosed in my copending application Serial No. 473,051, filed December 3, 1954, now U.S. Patent No. 2,799,647, on "Drilling fluid composition and method." As a specific example, 5 pounds per barrel of the particles of Figures 1–3 are added to 30 c.p. "Aquagel" drilling mud, along with 10 pounds per barrel of ground almond shells.

From the above description it will be understood that a novel drilling fluid composition and process for use of the same has been provided. The bridge initiating agent therefor is relatively inexpensive and permits the use of lost circulation prevention techniques in formations heretofore impossible to seal by such techniques. With the present invention, openings as large as 0.50 inch have been successfully bridged and it is anticipated that openings as wide as 1–2 inches can be sealed, thus resulting in a four- to eight-fold increase in the sealing effectiveness of conventional lost circulation materials.

Having fully described my invention, it is to be understood that I do not wish to be limited to the details set forth, but my invention is of the full scope of the appended claims.

I claim:

1. A drilling fluid comprising a liquid base, a lost-circulation material, and a bridge-initiating agent, said agent comprising a plurality of wedge-like particles of a rubber-like material capable of being suspended in said drilling fluid and being capable of maintaining said wedge shape when exposed to said fluid and to the temperature and pressure conditions of use, said wedge-like particles having at least one end portion defined by surfaces converging to form an acute angle, said surfaces of said end portion converging from a portion having a minimum dimension of at least about one-quarter inch, and no less than about one-eighth of said particles being of substantially the same size and shape.

2. A drilling fluid as defined in claim 1, wherein said particles are made of rubber.

3. A drilling fluid as defined in claim 1 wherein said particles are made of synthetic plastic.

4. A drilling fluid comprising a liquid base, a lost-circulation material, and about 2–20 pounds per barrel of a bridge-initiating agent per barrel of fluid, said agent comprising a plurality of wedge-like particles of a rubber-like material capable of being suspended in said drilling fluid and being capable of maintaining said wedge shape when exposed to said fluid and to the temperature and pressure conditions of use, said wedge-like particles having at least one end portion defined by surfaces converging to form an acute angle, said surfaces of said end portion converging from a portion having a minimum dimension of at least about one-quarter inch, and no less than about one-eighth of said particles being of substantially the same size and shape.

5. In a method of controlling loss of circulation of a drilling fluid from a well hole into the surrounding earthen formation, the steps comprising introducing into the bore hole a bridge-initiating agent, said agent comprising a plurality of wedge-like particles of a rubber-like material capable of being suspended in said drilling fluid and being capable of maintaining said wedge shape when exposed to said fluid and to the temperature and pressure conditions of use, said wedge-like particles having at least one end portion defined by surfaces converging to form an acute angle, said surfaces of said end portion converging from a portion having a minimum dimension of at least about one-quarter inch, and no less than about one-eighth of said particles being of substantially the same size and shape, and circulating said particles down the well to a lost-circulation zone therein.

6. A method as defined in claim 5 wherein said particles are composed mainly of rubber.

7. The method as defined in claim 5 wherein said particles are of synthetic plastic material.

8. A method of controlling loss of circulation of a drilling fluid from a well hole into the surrounding earthen formation comprising the steps of introducing into the drilling fluid a lost-circulation material and a bridge-initiating agent, said agent comprising a plurality of wedge-like particles of a rubber-like material capable of being suspended in said drilling fluid and being capable of maintaining said wedge shape when exposed to said fluid and to the temperature and pressure conditions of use, said wedge-like particles having at least one end portion defined by surfaces converging to form an acute angle, said surfaces of said end portion converging from a portion having a minimum dimension of at least about one-quarter inch, and no less than about one-eighth of said particles being of substantially the same size and shape, and pumping the resultant composition down the well to a lost-circulation zone therein.

9. A method of controlling loss of circulation of a drilling fluid from a well hole into the surrounding earthen formation comprising the steps of introducing into the drilling fluid a lost-circulation material and about 2–20 pounds per barrel of drilling fluid, of a bridge-initiating agent, said agent comprising a plurality of wedge-like particles of a rubber-like material capable of being suspended in said drilling fluid and being capable of maintaining said wedge shape when exposed to said fluid and to the temperature and pressure conditions of use, said wedge-like particles having at least one end portion defined by surfaces converging to form an acute angle, said surfaces of said end portion converging from a portion having a minimum dimension of at least about one-quarter inch, and no less than about one-eighth of said particles being of substantially the same size and shape, and pumping the resultant composition down the well to a lost-circulation zone therein.

References Cited in the file of this patent

UNITED STATES PATENTS

| | | |
|---|---|---|
| 2,561,075 | Sidwell | July 17, 1951 |
| 2,779,417 | Clark et al. | Jan. 29, 1957 |
| 2,894,906 | Sheeler | Oct. 29, 1957 |

OTHER REFERENCES

Rogers: Composition and Properties of Oil Well Drilling Fluids. Pub. 1953 by Gulf Pub. Co. of Houston, Texas, 2nd ed., pages 562 and 563.